United States Patent
Bechtl

(10) Patent No.: US 10,179,301 B2
(45) Date of Patent: Jan. 15, 2019

(54) ELONGATED SCRAPER PROFILE

(71) Applicant: Huber SE, Berching (DE)

(72) Inventor: Karl-Heinz Bechtl, Hilpoltstein (DE)

(73) Assignee: HUBER SE, Berching (DE)

( * ) Notice: Subject to any disclaimer, the term of this patent is extended or adjusted under 35 U.S.C. 154(b) by 411 days.

(21) Appl. No.: 14/808,134

(22) Filed: Jul. 24, 2015

(65) Prior Publication Data

US 2016/0023132 A1 Jan. 28, 2016

(30) Foreign Application Priority Data

Jul. 24, 2014 (DE) .......................... 10 2014 110 471

(51) Int. Cl.
*B01D 25/32* (2006.01)
*B01D 25/38* (2006.01)
(Continued)

(52) U.S. Cl.
CPC ............. *B01D 25/38* (2013.01); *B01D 25/32* (2013.01); *B01D 29/31* (2013.01); *B01D 29/35* (2013.01);
(Continued)

(58) Field of Classification Search
CPC ........ B01D 25/38; B01D 29/36; B01D 29/64; B01D 29/6469; B01D 29/6476;
(Continued)

(56) References Cited

U.S. PATENT DOCUMENTS 3,104,129 A * 9/1963 Bernard ................ B62J 1/00
297/215.16
4,018,899 A * 4/1977 Seckler .................. A23J 1/003
210/772
(Continued)

FOREIGN PATENT DOCUMENTS

DE 3720122 A1 12/1987
DE 4001121 A1 7/1991
(Continued)

OTHER PUBLICATIONS

Machine translation of DE 202012100753 U1.*
(Continued)

*Primary Examiner* — Katherine Zalasky
*Assistant Examiner* — Benjamin L Lebron
(74) *Attorney, Agent, or Firm* — Dority & Manning, P.A.

(57) ABSTRACT

An elongated scraper profile is provided, preferably for a dewatering device that serves the purpose of dewatering sludge. The scraper profile features a lip section extending in the direction of the longitudinal extension of the scraper profile, which serves the purpose of scraping sludge components from a screen surface. The scraper profile features a fastening section extending in the direction of the longitudinal extension, which serves the purpose of fixing the scraper profile with the assistance of a retainer assembly. The scraper profile also features an intermediate section connecting the lip section and the fastening section, whereas the intermediate section is flexibly formed in a direction
(Continued)

running perpendicular to the longitudinal extension, such that the lip section is moveable in the direction of the fastening section.

14 Claims, 6 Drawing Sheets

(51) Int. Cl.
| | |
|---|---|
| *B01D 29/31* | (2006.01) |
| *B01D 29/35* | (2006.01) |
| *B01D 29/48* | (2006.01) |
| *B01D 29/64* | (2006.01) |
| *B01D 46/00* | (2006.01) |
| *B30B 9/12* | (2006.01) |
| *B30B 9/18* | (2006.01) |
| *B30B 9/26* | (2006.01) |
| *C02F 11/12* | (2006.01) |
| *B01D 29/60* | (2006.01) |
| *B01D 46/44* | (2006.01) |

(52) U.S. Cl.
CPC ............ *B01D 29/48* (2013.01); *B01D 29/64* (2013.01); *B01D 29/6476* (2013.01); *B01D 46/0065* (2013.01); *B30B 9/12* (2013.01); *B30B 9/121* (2013.01); *B30B 9/128* (2013.01); *B30B 9/18* (2013.01); *B30B 9/26* (2013.01); *C02F 11/12* (2013.01); *C02F 11/125* (2013.01); *B01D 29/60* (2013.01); *B01D 46/44* (2013.01); *B30B 9/125* (2013.01); *B30B 9/127* (2013.01)

(58) Field of Classification Search
CPC ...... B01D 29/118; B01D 29/90; B01D 29/54; B01D 29/828; B01D 33/39; B01D 33/648; B01D 33/11; B01D 33/466; B01D 33/72; B01D 29/35; B01D 29/117; B01D 29/606; B01D 29/601; B01D 29/23; B01D 29/6415; B01D 29/906; B01D 29/94; B01D 46/446; B01D 46/0043; B01D 46/0065; B01D 46/442; B01D 46/0041; B01D 63/06; B01D 2201/184; B01D 2313/48; B01D 2321/2041; B01D 2321/30; B01D 25/32; B01D 29/31; B01D 29/48; B01D 29/60; B01D 46/44; C02F 11/125; C02F 11/12; F26B 5/14; B30B 9/00; B30B 9/12; B30B 9/121; B30B 9/128; B30B 9/18; B30B 9/125; B30B 9/127; B30B 9/26; B65G 33/26; B65G 45/14; B65G 45/18

See application file for complete search history.

(56) References Cited

U.S. PATENT DOCUMENTS

| | | | | |
|---|---|---|---|---|
| 4,041,854 | A | * | 8/1977 | Cox .................... B30B 9/12 100/112 |
| 4,217,220 | A | * | 8/1980 | Egli ................. B01D 29/118 210/413 |
| 4,772,177 | A | | 9/1988 | Hayashi |
| 5,061,366 | A | * | 10/1991 | Arai ................... B01D 29/25 100/117 |
| 5,280,890 | A | * | 1/1994 | Wydra .................. F16F 1/373 267/136 |
| 5,857,406 | A | | 1/1999 | Scheucher et al. |
| 6,187,180 | B1 | | 2/2001 | Bruke |
| 6,634,508 | B1 | | 10/2003 | Ishigaki |
| 7,730,635 | B2 | * | 6/2010 | Aveni .................. A43B 13/181 36/27 |
| 2005/0209563 | A1 | * | 9/2005 | Hopping ............... A61M 1/28 604/151 |
| 2005/0247544 | A1 | * | 11/2005 | Chesack .............. B65G 33/26 198/657 |
| 2011/0220586 | A1 | | 9/2011 | Levitt |
| 2013/0082064 | A1 | * | 4/2013 | Larson .................. C08G 2/00 220/600 |
| 2014/0131169 | A1 | | 5/2014 | Themann |

FOREIGN PATENT DOCUMENTS

| | | |
|---|---|---|
| DE | 19715173 C2 | 3/1999 |
| DE | 69730619 T2 | 8/2005 |
| DE | 60028187 T2 | 3/2007 |
| DE | 202012100753 U1 | 4/2012 |
| DE | 102010062970 A1 | 6/2012 |
| DE | 102012022189 B3 | 2/2014 |
| DE | 202012010693 U1 | 2/2014 |
| FR | 2763054 A1 | 11/1998 |
| GB | 708177 | 4/1954 |
| JP | H02-29028 | 11/1990 |
| JP | H0857692 A | 3/1996 |
| JP | H1043890 A | 2/1998 |
| JP | 2004-243304 | 9/2004 |
| JP | 2009-511382 | 3/2009 |
| WO | WO2011092819 A1 | 8/2011 |

OTHER PUBLICATIONS

European Patent Office Search Report, dated Jan. 8, 2016.
Japanese Office Action, dated Oct. 2, 2018, patent application No. 2015-137466.

\* cited by examiner

ELONGATED SCRAPER PROFILE

FIELD OF THE INVENTION

The present invention relates to an elongated scraper profile, preferably for a dewatering device that serves the purpose of dewatering sludge. The scraper profile features a lip section extending in the direction of the longitudinal extension of the scraper profile, which, for example in a state installed in the dewatering device, serves the purpose of scraping sludge components from a screen surface. The scraper profile features a fastening section extending in the direction of the specified longitudinal extension, which serves the purpose of fixing the scraper profile with the assistance of a retainer assembly, for example in the specified dewatering device.

In addition, a dewatering device for the dewatering of sludge is described, whereas the dewatering device features at least one inlet opening for the sludge. The dewatering device features a pressing assembly, with the assistance of which the sludge is able to undergo a pressing process after passing the inlet opening, with which the liquid present in the sludge is driven out of the sludge. The pressing assembly comprises a worm shaft that is movable in a rotary motion with the assistance of a drive and a screen surface surrounding the worm shaft at least in sections, whereas the worm shaft has, in its outer area turned towards the screen surface, at least one scraper profile, through which the worm shaft is in contact with the screen surface. The dewatering device features at least one outlet opening for the liquid driven out of the sludge, and at least one discharge opening for the sludge at least partly dewatered by means of the dewatering device.

BACKGROUND

Scraper profiles conforming to this type are used, for example, in systems with which a watery substance, for example (partially dewatered) sludge, is guided along a screen surface with the assistance of scraper elements, through which screen surface any liquid that is still present is driven out of the substance. Thereby, the scraper profiles are attached to the scraper elements and form the transition to the screen surface. If the scraper elements move along the screen surface, the scraper profiles ensure that the substance to be dewatered is directed on the screen surface and thereby comes into contact with new areas of the screen surface. For this purpose, the scraper profiles usually have the specified longitudinal extension; that is, its length is a multiple of its width and/or height.

Thereby, it is possible to, among other things, attach the scraper profiles peripherally in a circumferential groove of a worm shaft, which moves in a cylindrical screen surface. In turn, corresponding worm shafts are used in the aforementioned dewatering devices, with which sludge is moved, with the assistance of the worm shaft, along a cylindrical screen surface surrounding the worm shaft, is thereby pressed and is thus dewatered.

With the known state of the art, it is disadvantageous that the gap between the screen surface and the areas of the worm shaft that are opposite the screen surface and bear the scraper profiles are not always constant (for example, because the screen surface features a low unbalance). This gives rise to local stresses of the scraper profiles or a gap in certain spots between the screen surface and the adjacent scraper profiles. In turn, this has the consequence that either the scraper profiles are too heavily degraded, or the dewatering of sludge to be dewatered is unsatisfactory.

SUMMARY OF THE INVENTION

As such, a task of the present invention is to propose a scraper profile along with a dewatering device with one or more scraper profiles that differ from the known state of the art regarding the matter set forth above in an advantageous manner. Additional objects and advantages of the invention will be set forth in part in the following description, or may be obvious from the description, or may be learned through practice of the invention.

The tasks are solved by a scraper profile along with a dewatering device with the characteristics described herein.

In accordance with the invention, the scraper profile is characterized by the fact that it features, in addition to a lip section (which, for example, in a state installed in the dewatering device, serves the purpose of scraping sludge components from a screen surface) and a fastening section (which serves the purpose of fixing the scraper profile with the assistance of a retainer assembly, for example a retainer assembly of the dewatering device), an intermediate section connecting the lip section and the fastening section, whereas the intermediate section is flexibly formed in a direction running perpendicular to the longitudinal extension of the scraper profile, such that the lip section is moveable in the direction of the fastening section.

In contrast to the state of the art, the gap between the lip section and the fastening section is no longer rigid. Rather, the flexible intermediate section allows relative movement between the lip section and the fastening section, such that, even with a system at an uneven surface or a surface featuring an unbalance (for example, in the form of a screen surface), the lip section always comes into contact with the corresponding surface, and the desired movement of the sludge to be dewatered or the medium to be scraped is thus ensured. In addition, given the flexible intermediate section, the mechanical stress of the scraper profile is relatively low, since unevenness does not lead to damages to the lip section, but merely to a reversible deformation of the intermediate section.

The lip section and the fastening section feature, in contrast to the intermediate section, a relatively high strength and stiffness, such that the application of force (up to a certain amount) leads solely to a deformation of the intermediate section, but not the lip section or fastening section. For this purpose, the scraper profile preferably features a cross-sectional shape that is always constant in the direction of the longitudinal extension of the scraper profile. In addition, the flexibility of the specified sections should be sufficiently high in order to bend the scraper profile from a straight-line basic shape into a curved (in particular, spiral-shaped) shape and, in this state, fit it on a worm shaft.

In addition, the scraper profile, or at least its lip section, should consist of a material that is resistant to microbes and hydrolysis, in order to prevent damages when in contact with various substances, for example, in the form of sludge. Preferably, the scraper profile in accordance with the invention is used with systems that serve the purpose of dewatering of sludge that accrues upon the cleaning of (for example, municipal) waste water. However, it is also conceivable that the scraper profile is used in other systems that serve the purpose of, for example, treating waste water or sludge. Waste water rakes, screening systems, and augers known from the state of the art must be noted at this place. The scraper profile can also be used for conveyor belts or sieve belts or other devices with which a scraping of impurities or other substances from a surface coming into contact with the scraper profile is desired.

In order to enable the flexible movement of the lip section, it is advantageous if the intermediate section, in a cross-section running perpendicular to the specified longitudinal extension, features a shape that is curved at least in sections. The intermediate section can be formed, for example, with a C-shape, whereas one end of the C-shape is connected to the lip section and the other end is connected to the fastening section, or merge into the specified sections. The belly section of the C-shape is finally located between the lip section and the fastening section and, upon a movement of the lip section, is compressed in the direction of the fastening section, in order to enable the relative motion in accordance with the invention between the sections specified above. Thus, as a general matter, it is advantageous if, in a cross-section running perpendicular to its longitudinal extension, the intermediate section features, at least in sections, a width that is smaller than the lip section and the fastening section. In this case, the desired relative motion can also occur if the bending stiffness of all of the sections is equally high.

It is also highly advantageous if, in a cross-section running perpendicular to the longitudinal extension, the intermediate section features, at least in sections, a shape that is bent once or multiple times. In particular, it is advantageous if, in the specified cross-section, the intermediate section features two areas that run to each other at an angle between 20° and 70°, whereas a first area merges into the lip section and a second area merges into the fastening section.

It is also advantageous if the lip section, the fastening section and the intermediate section are formed in one piece. For example, the scraper profile could feature a uniform cross-section, and could be manufactured by means of casting, injection molding or a different molding process. In this connection, it is particularly advantageous if the scraper profile is present as an extruded profile, such that its manufacturing can be easy and cost-effective.

Furthermore, it is advantageous if the lip section and/or the fastening section and/or the intermediate section consists, at least for the most part, of a plastic, the Shore hardness of which amounts to between 60 Shore A and 100 Shore A, preferably between 65 Shore A and 90 Shore A. A hardness in the specified range ensures low flexibility of the lip section and the fastening section. If the width of the intermediate section extending into a cross-section running perpendicular to the longitudinal extension is less than the width of the lip section and/or the fastening section, the intermediate section may feature the same hardness as the remaining sections, whereas a movement of the lip section in the direction of the fastening section is nevertheless possible.

It is also advantageous if the scraper profile features a longitudinal extension, the amount of which is at least 1 m, preferably at least 2 m, in particular preferably at least 5 m. In such a case, the scraper profile can be produced as goods sold by the meter and, during its installation into a corresponding dewatering device, shortened to the desired length. Preferably, the scraper profile also features a height running perpendicular to the longitudinal extension and pointing from the fastening section in the direction of the lip section, the amount of which is between 10 mm and 60 mm, preferably between 15 mm and 50 mm. Finally, it is advantageous if the scraper profile features a width running perpendicular to the longitudinal extension of the scraper profile and perpendicular to the specified height, the amount of which is between 4 mm and 16 mm, preferably between 6 mm and 14 mm.

It is advantageous if the fastening section features a reinforcement, which is arranged in a recess or a cavity of the fastening section, extending in the direction of the longitudinal extension of the scraper profile. Thereby, the reinforcement should feature a hardness that is higher than the fastening section. In any case, the reinforcement allows for the fastening of the fastening section through a fastening element acting on the fastening section from the outside. For example, it would be conceivable to use the scraper profile in a circumferential groove of a worm shaft and subsequently fix it with the assistance of several (grub) screws arranged in a distributed manner in the direction of the longitudinal extension of the scraper profile, whereas the screws are connected to the fastening section between the reinforcement and the intermediate section, and press the scraper profile in the direction of the groove base. In any case, the reinforcement should extend consistently in the direction of the longitudinal extension of the scraper profile, in order to increase the overall stiffness of the scraper profile.

It is particularly advantageous if the reinforcement is formed by a metal or plastic profile, for example a wire cable, extending in the direction of the longitudinal extension of the scraper profile. The wire cable preferably has a thickness between 1 mm and 5 mm, in order to, despite the high strength, allow for the bending of the scraper profile in a direction running perpendicular to its longitudinal extension.

It is advantageous if the reinforcement is embedded in the fastening section, at least on the circumference. However, it is conceivable that the reinforcement is visible from the outside in the two front sides of the scraper profile, whereas this case will particularly arise if the scraper profile comprises a crosscut section of a continuous (extruded) profile.

The dewatering device in accordance with the invention finally has at least one scraper profile according to the previous or subsequent description, whereas the respective characteristics can be realized individually or in any combination, as long as the scraper profile features an intermediate section connecting the fastening section and the lip section and the intermediate section is flexibly formed in a direction running perpendicular to the longitudinal extension, such that the lip section is movable in the direction of the fastening section.

It is also advantageous if the scraper profile is fixed with the assistance of fastening elements, whereas the fastening elements fix the scraper profile in the area of its fastening section in a positively-locking or force-fitting manner. For example, screws, in particular grub screws (screws without heads), which fix the scraper profile in the area of its fastening section in a clamping manner against a retainer assembly of the worm shaft, may be used as fastening elements.

It is also advantageous if the worm shaft features a cavity running on the circumference, particularly in the form of a groove, whereas the fastening section and the intermediate section of the scraper profile run within the cavity, and whereas the lip section, at least in part, protrudes from the cavity and is in contact with the screen surface. While the fastening section and the intermediate section are protected within the cavity, the lip section is in contact with the screen surface and thereby ensures the desired movement of the sludge along the screen surface.

BRIEF DESCRIPTION OF THE DRAWINGS

Additional advantages of the invention are described in the following embodiments. The following is shown, in each case schematically.

DETAILED DESCRIPTION

Figure 1:
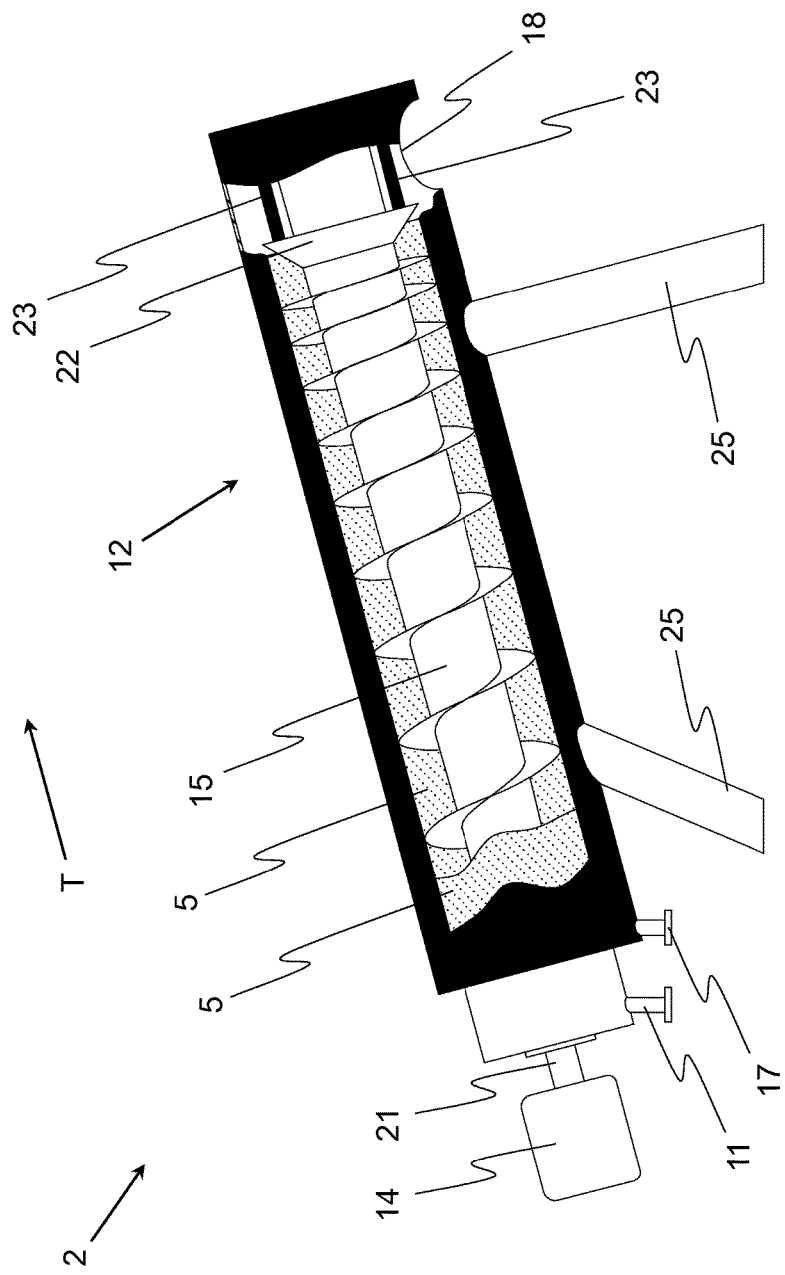
FIG. 1 a side view of a dewatering device without sludge.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Figure 2:
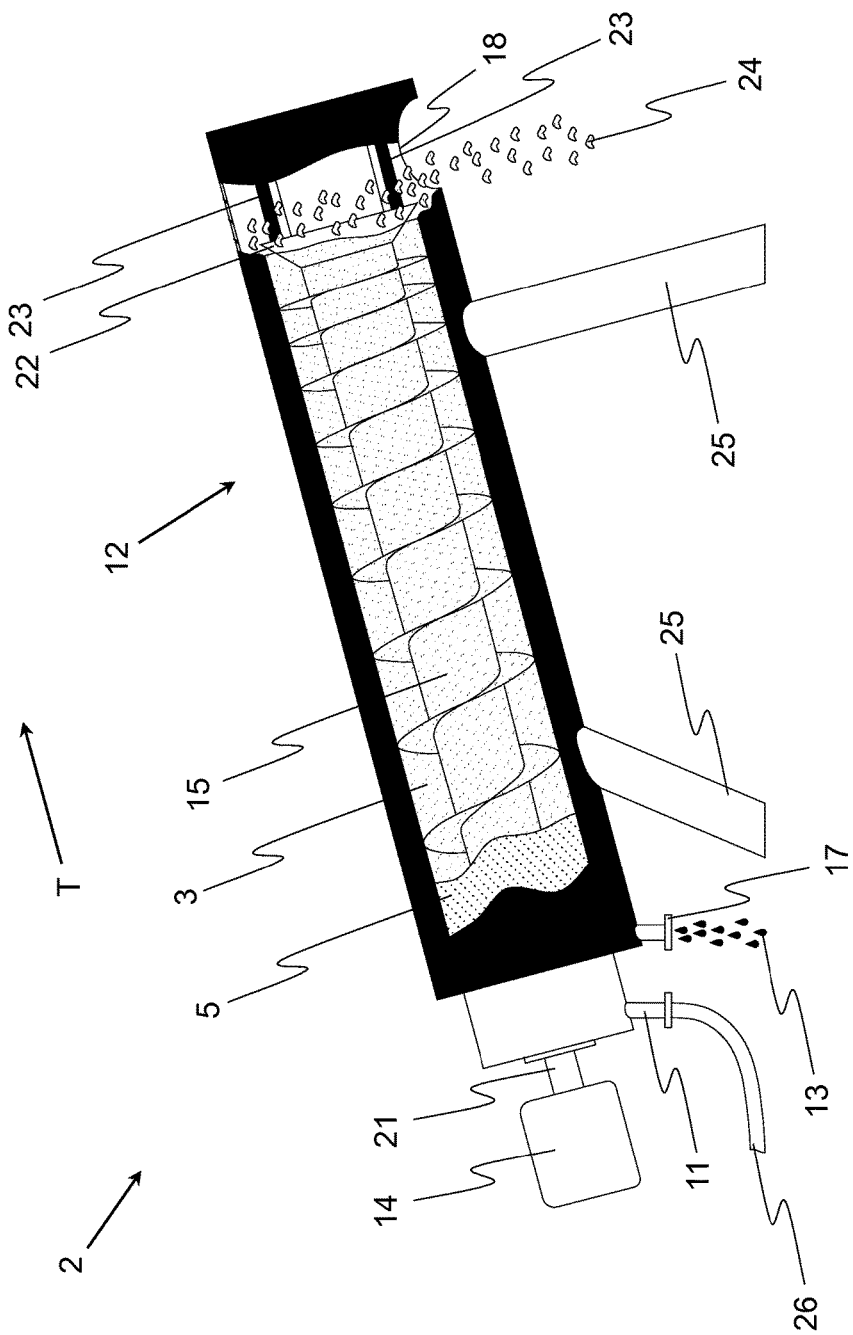
FIG. 2 the dewatering device in accordance with FIG. 1 during its operation.

FIGS. 1 and 2 show a dewatering device 2 for the dewatering of sludge 3, whereas, for reasons of clarity, the dewatering device 2 is shown in an empty state (FIG. 1) and in an operating state (FIG. 2) in which it is passed by a sludge 3 to be dewatered.

In principle, the dewatering device 2 mounted, for example, through a frame 25 has an inlet opening 11 for the sludge to be dewatered 3 (which can be connected, for example, to a hose 26, through which the sludge 3 can be fed). Connected to the inlet opening 11 is a pressing assembly 12, which is passed by the sludge 3 in a transport direction T and which may include, for example, as shown in FIGS. 1 and 2, a worm shaft 15 and a screen surface 5 enclosing the worm shaft 15 (the generally cylindrical screen surface 5 is only partially shown in the figures, in order to enable a look into the inside of the pressing assembly 12).

Through the changing, preferably decreasing, slope of the worm shaft 15 and/or its possibly changing, preferably increasing outer diameter in the direction of a discharge opening 18, the sludge 3 is pressed, whereby the discharge of liquid 13 through the screen surface 5 arises. To support the pressing process, the dewatering device 2 preferably has a counter-surface, for example, in the form of the pressure cone 22 that is shown. Thereby, the pressure cone 22 is located in the top end area of the worm shaft 15 and, with a corresponding outer wall, forms a ring-shaped gap that can be passed by the dewatered sludge 3. Through the adjustment of the pressure cone 22 in an axial direction of the axis of rotation 21 of the worm shaft 15 powered through a drive 14, the specified gap ultimately may be changed, and thus the counter-pressure may be adjusted during the pressing process (for this purpose, for example, one or more (for example, pneumatically operated) adjusting elements 23 are available).

The liquid 13 is finally fed, during the pressing process, between the screen surface 5 and a corresponding outer shell of the dewatering device 2 downwards in the direction of the outlet opening 17. There, it can be, for example, led away with the assistance of a hose assembly (not shown) or collected with the assistance of a collection device.

In turn, after passing the large part of the pressing assembly 12, the sludge 3 reaches the specified discharge opening 18. Finally, the sludge components 24 retained by the screen surface 5 can be collected or led to a further process with a conveying device.

Figure 3:
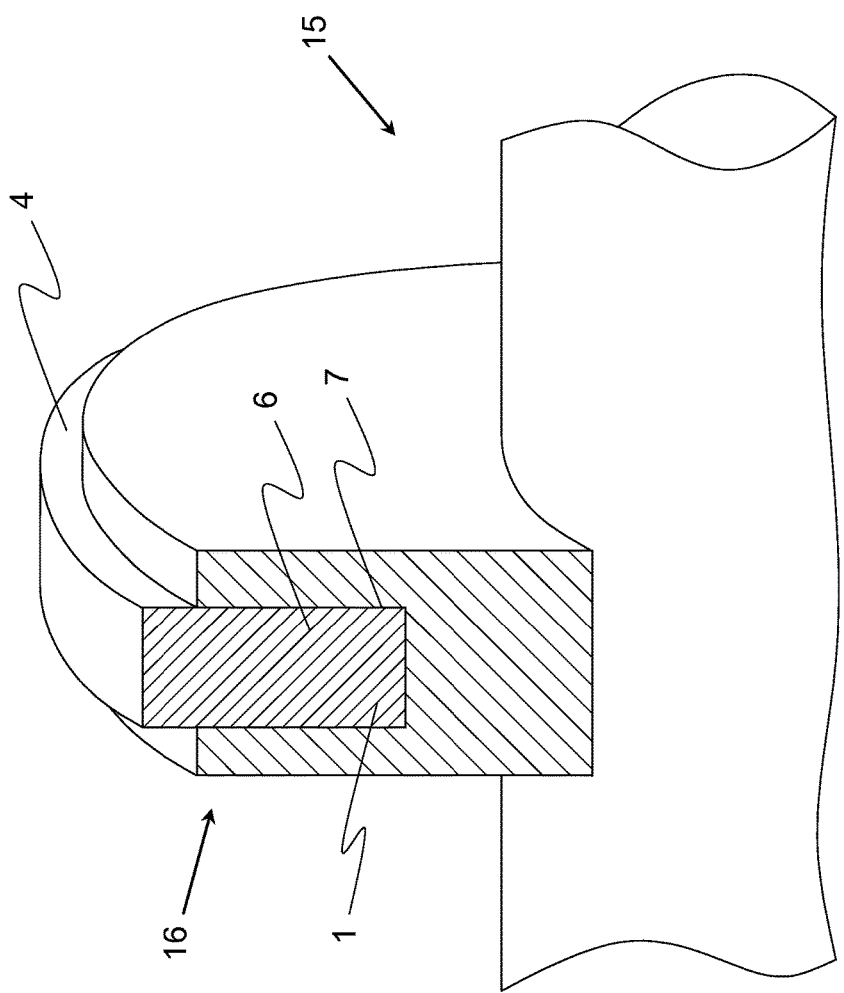
FIG. 3 a cut-out of a worm shaft of a dewatering device.

In order to ensure that the sludge 3 is reliably transported from the worm shaft 15 to the area of the discharge opening 18 and is thereby dewatered, providing the worm shaft 15 with a scraper profile 1 in its outer area 16 adjacent to the screen surface 5 is known. FIG. 3 shows a cut-out of a corresponding worm shaft 15, where the scraper profile 1 has a fastening section 6, through which it is held in a (for example, groove-shaped) retainer assembly 7. In addition, a lip section 4 is present, which extends outside of the retainer assembly 7 and, in the operation of the dewatering device 2, is in contact with the screen surface 5.

With the solution shown in FIG. 3, it is disadvantageous that the lip section 4 is partially exposed to a high force acting in the direction of the fastening section 6, if the shape of the screen surface 5, due to the low unbalances, deviates, in sections, from the shape of a cylinder.

To counter this disadvantage, in accordance with the invention, it is proposed that the scraper profile 1 features an intermediate section 8 arranged between the fastening section 6 and the lip section 4, which intermediate section is shaped in such a manner that it allows for relative movement between the lip section 4 and the fastening section 6.

Figure 4:
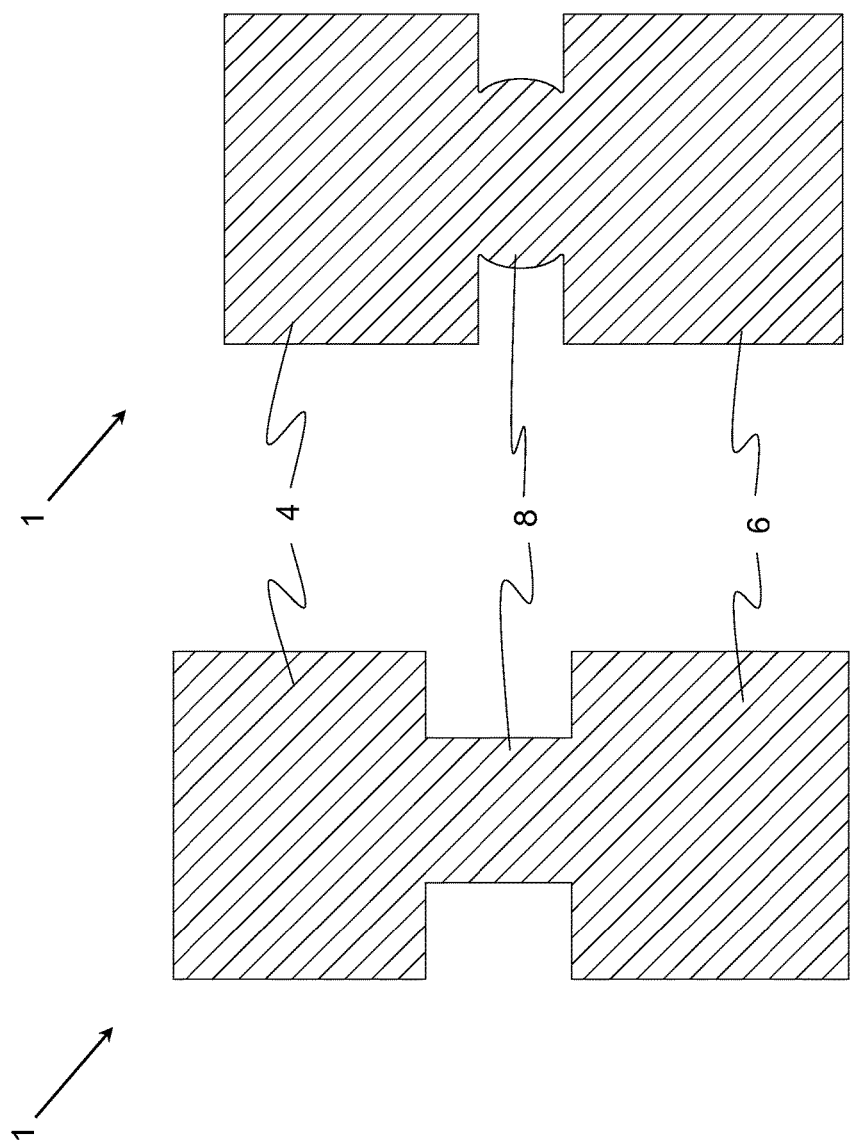
FIG. 4 a cross-section of two scraper profiles (left: unloaded, right: compressed based on an external load), FIG. 5 a cross-section of an additional scraper profile, and FIG. 6 a cross-section of an additional scraper profile (left: without a retainer assembly and without a reinforcement; right: with a reinforcement and fastened in a retainer assembly).

A possible design of the intermediate section 8 can be seen in FIG. 4; this shows a cross-section running perpendicular to the longitudinal extension L of the scraper profile 1. In such a case, the intermediate section 8 is characterized by the fact that its width running parallel to the blade level is smaller than the width of the remaining two sections. Thereby, the intermediate section 8 can be compressed in the direction of the height H of the scraper profile 1 (left image in FIG. 4: uncompressed; right image: compressed), such that unbalances of screen surface 5 can be compensated (incidentally, the longitudinal extension L of the scraper profile 1 extends in a manner perpendicular to the blade level). Of course, the scraper profile 1 shown in FIG. 4 can also be used in connection with the worm shaft 15 described above, and can thereby be fixed by a corresponding retainer assembly 7 (this also applies to the embodiments described in more detail below).

Figure 5:
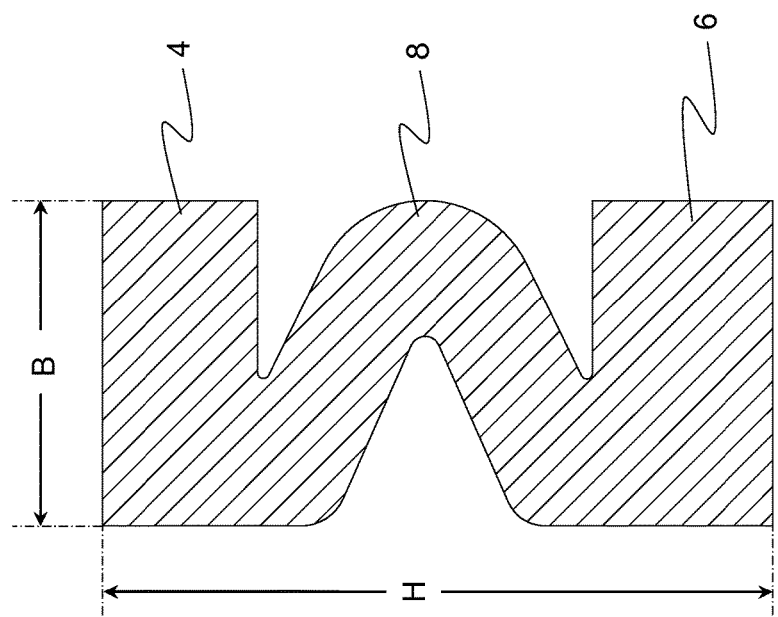
Figure 5:
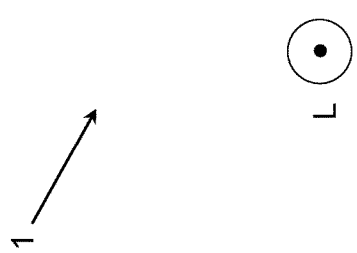

FIG. 5 shows a particularly advantageous embodiment (in which, representative for the remaining embodiments, the width B, the height H and the longitudinal extension L of the scraper profile 1 running perpendicular to the blade level are also identified). In this case, the intermediate section 8 consists of two sections, which feature a bent overall shape. If a force acting in the direction of the fastening section 6 then acts on the lip section 4, the intermediate section 8 can deflect without appreciable compression, such that the lip section 4 can always come into contact cleanly with the screen surface 5 without excessive mechanical stress.

In addition, it must be pointed out in this place that the outer contour of the scraper profiles 1 should be uniform in the direction of their longitudinal extension L.

Figure 6:
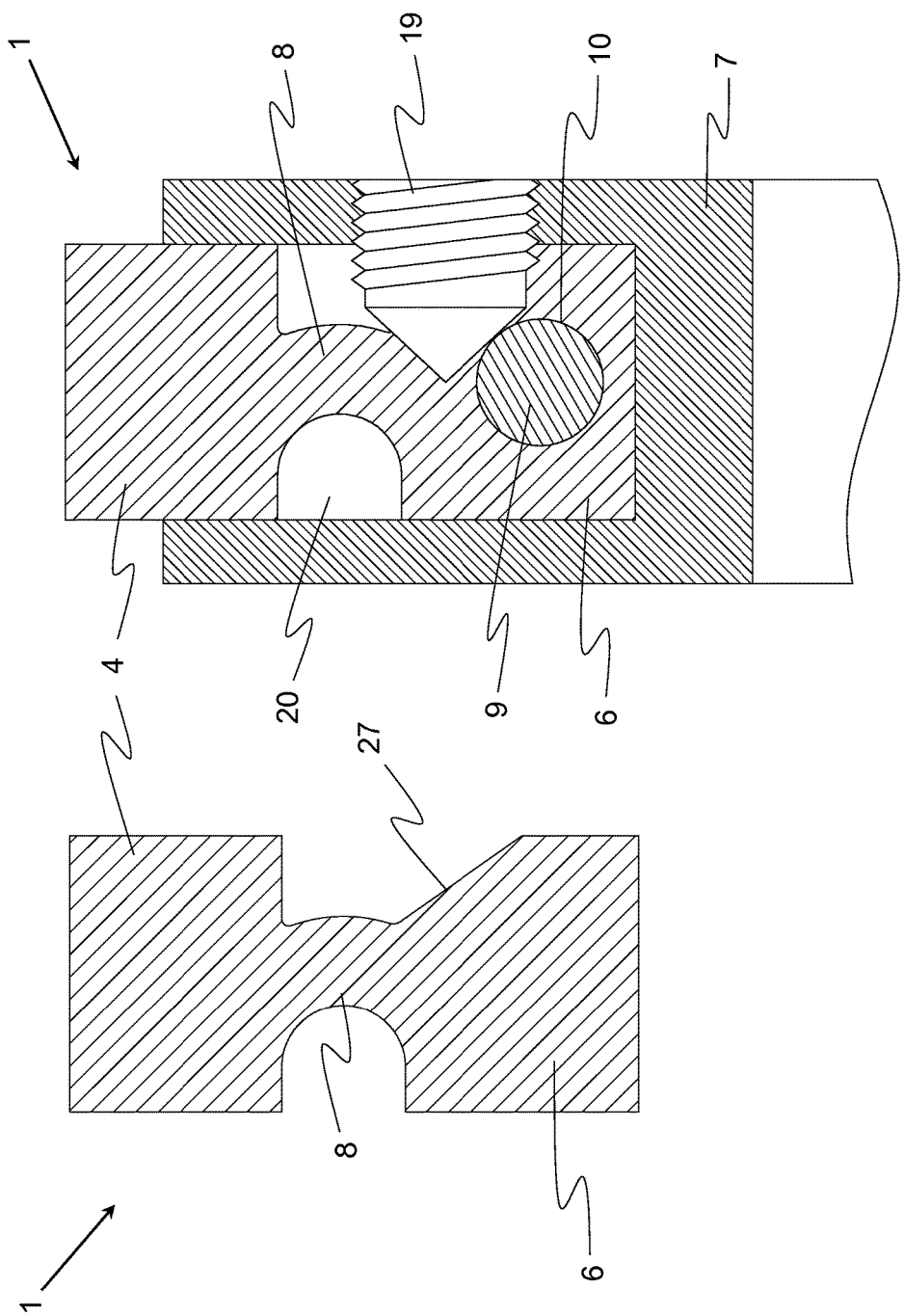

FIG. 6 shows a final embodiment of a corresponding scraper profile 1, whereas, in the right image, the scraper profile 1 shown in the left image is fixed in a retainer assembly 7 of a worm shaft 15.

In the case shown in FIG. 5, the scraper profile 1 also has an intermediate element that allows for relative movement between the lip section 4 and the fastening section 6, whereas, in the shown cross-section, the intermediate section 8 has a C-shape, at least in sections.

Finally, in principle (that is, regardless of its exact cross-section or the shape of its intermediate section 8), the scraper profile 1 may feature a reinforcement 9 arranged in a recess 10, as shown in the right image of FIG. 6. The reinforcement 9 may be present as, for example, a wire cable or another string-shaped element that is completely embedded in the fastening section 6, preferably on the circumference. If, with the assistance of fastening elements 19, for example, the grub screws shown in FIG. 6, the scraper profile 1 is fixed against a corresponding retainer assembly 7 (which is preferably formed in a groove shape and features the cavity 20 shown in FIG. 6), such that the reinforcement 9 is pressed in the direction turned away from the lip section 4. Thereby, a secure fastening of the scraper profile 1 finally takes place; this prevents the slipping of the scraper profile 1 against the retainer assembly 7.

In order to simplify the fitting of the scraper profile 1, it is finally advantageous if the area of the fastening section 6 turned towards the fastening element 19 has a flat portion 27 shown in FIG. 6 (right image).

The invention is not limited to the illustrated and described embodiments. Variations within the framework of the claims, such as any combination of the described characteristics, are also possible, even if they are presented and described in different parts of the description and/or the claims, or in different embodiments.

The invention claimed is:

1. A scraper for a dewatering device that dewaters sludge and includes a screen surface, a worm shaft rotatable about an axis of rotation extending in an axial direction and including a retainer assembly having a remote end and a distal end disposed spaced apart from the remote end, which is configured for connection to the scraper, the distance between the axis of rotation and the distal end of the retainer assembly being smaller than the distance between the axis of rotation and the remote end of the retainer assembly, the scraper comprising:
   a body that elongates in a longitudinal direction, which is the direction that is normal to the axial direction, the body includes a fastening section configured to be fixed in the retainer assembly;
   the body includes a lip section extending in the longitudinal direction of the body of the scraper and disposed spaced apart from the fastening section, the lip section configured to scrape sludge components from the screen surface in the dewatering device; and
   the body includes an intermediate section disposed between and unitary with the lip section and the fastening section and configured to be retained within the retainer assembly, the intermediate section flexibly formed for movement in the axial direction within the retainer assembly while accommodating compression in the longitudinal direction when the lip section is movable towards the fastening section upon compression of the intermediate section in use of the dewatering device; and
   wherein each of the lip section and the fastening section has a higher strength and stiffness than the strength and stiffness of the intermediate section.

2. The scraper according to claim 1, wherein the intermediate section has a cross-section running perpendicular to the longitudinal direction that is curved at least in sections.

3. The scraper according to claim 1, wherein the intermediate section has a cross-sectional shape running perpendicular to the longitudinal direction that is bent once or multiple times.

4. The scraper according to claim 1, wherein the scraper is a one piece extruded component.

5. The scraper according to claim 1, wherein the scraper is made of a plastic material having a Shore hardness between 60 Shore A and 100 Shore A.

6. The scraper according to claim 1, wherein the scraper has a length in the longitudinal extension direction of at least 1 m, a height running perpendicular to the longitudinal extension direction from the fastening section to the lip section between 10 mm and 60 mm, and a width running perpendicular to the longitudinal extension direction and perpendicular to the height of between 4 mm and 16 mm.

7. The scraper according to claim 1, wherein the intermediate section is flexibly formed for movement within the retainer assembly while accommodating compression of the body in the longitudinal direction.

8. The scraper according to claim 1, wherein the body defines a first recess coextensive with part of the intermediate section in a cross-section running perpendicular to the longitudinal direction, and the first recess is substantially V-shaped.

9. The scraper according to claim 1, wherein the body defines a first recess coextensive with the intermediate section in a cross-section lying in a plane running perpendicular to the longitudinal direction, and the shape of the first recess in the cross-section lying in the plane running perpendicular to the longitudinal direction is substantially defined by a first straight leg, a second straight leg angled at an acute angle with respect to the first straight leg and joined on one end to one end of the first straight leg by a curved section.

10. The scraper according to claim 9, wherein the first recess is configured to receive therein a fastening element.

11. The scraper according to claim 9, wherein the body defines a second recess coextensive with less than the entire intermediate section in the cross-section lying in the plane running perpendicular to the longitudinal direction, and the intermediate section being interposed between the first recess and the second recess.

12. A dewatering device that dewaters sludge and comprises:
   a screen surface;
   a worm shaft rotatable about an axis of rotation extending in an axial direction and including a retainer assembly having a remote end and a distal end disposed spaced apart from the remote end, which is configured for connection to a scraper, the distance between the axis of rotation and the distal end of the retainer assembly being smaller than the distance between the axis of rotation and the remote end of the retainer assembly; and
   a scraper comprising:
      a body that elongates in a longitudinal direction, which is the direction that is normal to the axial direction, the body includes a fastening section fixed in the retainer assembly;
      the body includes a lip section extending in the longitudinal direction of the body of the scraper and disposed spaced apart from the fastening section, the lip section configured to scrape sludge components from the screen surface; and
      the body includes an intermediate section disposed between and unitary with the lip section and the fastening section and retained within the retainer assembly, the intermediate section flexibly formed for movement in the axial direction within the retainer assembly while accommodating compression in the longitudinal direction when the lip section is movable towards the fastening section upon compression of the intermediate section in use of the dewatering device; and wherein each of the lip section and the fastening section has a higher strength and stiffness than the strength and stiffness of the intermediate section.

13. The dewatering device according to claim 12, wherein the scraper is fixed with fastening elements at the fastening section in a positively-locking or force-fitting manner.

14. The dewatering device according to claim 12, wherein the worm shaft comprises a groove running along a circumference thereof, the fastening section and the intermediate section of the scraper disposed in the groove, and the lip section of the scraper protruding from the groove and contacting the screen surface.

* * * * *